United States Patent [19]
Kurasawa

[11] 3,711,193
[45] Jan. 16, 1973

[54] SHUTTER RELEASE DEVICE FOR CINE CAMERAS

[75] Inventor: Makoto Kurasawa, Sumida-ku, Tokyo, Japan

[73] Assignee: Kabushiki Kaisha Ricoh, Tokyo, Japan

[22] Filed: June 9, 1971

[21] Appl. No.: 51,186

[30] Foreign Application Priority Data

June 19, 1970 Japan ................................45/60875

[52] U.S. Cl.............................................352/178
[51] Int. Cl.............................................G03b 9/08
[58] Field of Search..............................352/174, 178

[56] References Cited

UNITED STATES PATENTS

| | | | |
|---|---|---|---|
| 3,106,126 | 10/1963 | Kirk | 352/178 X |
| 3,246,944 | 4/1966 | Winkler | 352/174 X |
| 3,427,103 | 2/1969 | McCain | 352/178 |
| 3,511,948 | 5/1970 | Marvin | 352/178 X |
| 3,598,480 | 8/1971 | Kubota | 352/178 X |

Primary Examiner—John M. Horan
Attorney—Milton J. Wayne and Erwin Koppel

[57] ABSTRACT

Upon depression of a shutter release button a detent lever is rotated under the force of a click-motion spring, and simultaneously a motor driving circuit is closed. Upon release of the shutter release button, the detent lever is returned to its initial position under the force of the click-motion spring to stop the shutter blade, and simultaneously the circuit is opened.

3 Claims, 1 Drawing Figure

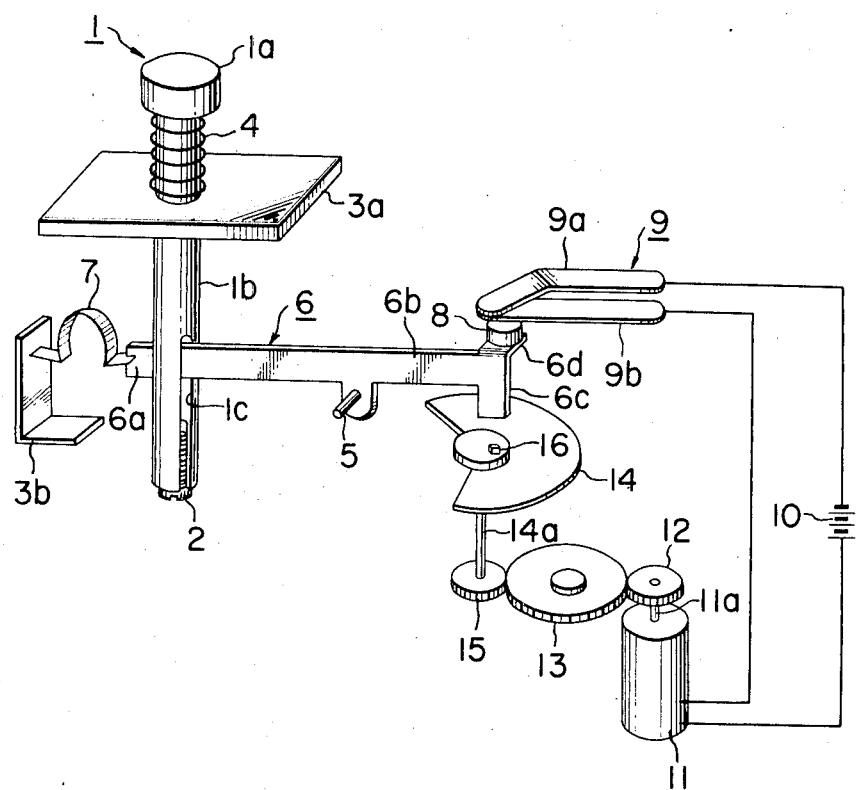

SHUTTER RELEASE DEVICE FOR CINE CAMERAS

BACKGROUND OF THE INVENTION

The present invention relates to a cine camera, and more particularly a shutter release mechanism for cine cameras.

In the conventional cine cameras, a lever for permitting and stopping the rotation of a shutter blade is directly coupled to a shutter release button, so that the speed of rotation of this lever for engagement with a stopper carried by the shutter blade is dependent upon the velocity of movement of the shutter release button. If the shutter release button is gradually and slowly actuated, the speed of the detent lever for engagement with the stopper is so slow that the detent lever can only slightly engage with the stopper. In some cases, the lever is moved away by the stopper, so that the lever cannot stop the rotation of the shutter blade, and noise is produced. Furthermore, a power switch of a motor for driving the shutter blade is also directly coupled to the shutter release button, so that even after the rotation of the shutter blade is locked, the rotation of the motor continues until the shutter release button is completely returned to its initial or inoperative position. In addition, when the stopper is pushed by the detent lever, a considerable frictional force is produced between them, so that the force of a spring for returning the detent lever to its initial position must be increased to overcome this frictional force. As a result, a greater force is required to depress the shutter release button. When the shutter blade is locked under the frictional force between the shutter detent lever and the stopper whose upper surface engages with the detent lever, the shutter blade cannot close the aperture completely, and the power switch remains closed, so that the power source battery is rapidly consumed.

The overcome these defects described above, there has been proposed an arrangement employing an electromagnet for quickly returning the shutter detent lever to its initial position independently of the speed of the shutter release button, but the power consumption becomes greater, thus resulting in high cost. In addition the residual magnetism of the electromagnet adversely affects the exposure meter, thus resulting in incorrect exposure.

SUMMARY OF THE INVENTION

One of the objects of the present invention is therefore to eliminate the defects of the prior art shutter release devices described above.

Another object of the present invention is to provide a shutter release device in which a shutter detent lever rotates at a constant speed independent of the depression or release speed of a shutter release button so that positive and reliable engagement between the detent lever and its stopper may be attained.

Another object of the present invention is to provide a shutter release device which is simple in construction but can accomplish the above and other objects of the present invention in a satisfactory manner.

According to one aspect of the present invention, a click-motion spring is interposed between a support securely fixed to a camera body and one end of a shutter detent lever pivoted also to the camera body in such a manner that the detent lever may be rotated at high speed, and the other end of this lever serves to close and open a power switch of a motor for driving a shutter blade upon rotation of the detent lever in response to the depression and release of the shutter release button.

According to another aspect of the present invention, an omega-shaped leaf spring is employed as the click-motion spring, but any other suitable spring such as coiled springs and the like may be employed as far as they exhibit such characteristic that the direction of spring force is suddenly reversed when they are compressed beyond a "dead point."

According to the present invention, the shutter release button serves to rotate the the detent lever until the clock-motion spring reaches its "dead point," but thereafter this click-motion spring serves to quickly rotate the detent lever independently of the depression or release of the shutter release button. As a result, the other end of the detent lever may quickly and securely engage with the stopper so that the defects of the prior art shutter release devices may be eliminated. The shutter release device of the present invention is very simple in construction because the additional component part which is added in addition to the component members of the conventional devices is only the click-motion spring interposed between one end of the detent lever and the camera body. Therefore, the manufacturing cost will not be increased too much.

The other objects, advantages and features of the present invention will become more apparent from the following description of the preferred embodiment thereof taken in conjunction with the accompanying drawing.

BRIEF DESCRIPTION OF THE DRAWING

The single FIGURE is a schematic perspective view of the preferred embodiment in accordance with the present invention.

DESCRIPTION OF THE PREFERRED EMBODIMENT

A shutter release button 1 comprises a head 1a and a leg portion 1b having an elongated slot 1 formed at the lower portion thereof. A setscrew or adjustment screw 2 is screwed into the lower end of the slot 1c so that a slit is defined between the upper end of the elongated slot 1c and the upper end of the setscrew 2, and the length of this slit may be adjusted by tightening or loosening this adjusting screw 2. A coiled spring 4 is interposed between a support 3a securely fixed to the camera body and the head 1a of the shutter release button 1 so that the shutter release button 1 may be normally biased upwardly. One end 6a of a shutter detent lever 6 pivoted at 5 to the camera body is extended through the slit or slot 1c. A click-motion spring 7 is interposed between the one end 6a and a support 3b fixed to the camera body, and the mode of actuation of this click-motion spring will be described in detail hereinafter. The other end 6b of the lever 6 has a horizontal projection 6d and a downwardly extending projection 6c, and an electrically insulating projection 8 is fixed to the horizontal projection 6d to open and close a switch 9 comprising a pair of contact members 9a and 9b. The switch 9 serves to close or open the circuit comprising a power source 10 and a motor 11 for driving the shutter. The rotation of the motor 11 is transmitted to a shutter blade 14 through a gear 12 carried by the drive shaft 11a of the motor 11, an intermediate gear 13 and a gear 15 carried by the lower end of the shutter blade drive shaft 14a. A stopper 16 carried by the shutter blade 14 eccentrically of its center of rotation is adapted to engage with the downwardly extending projection 6c of the lever 6.

Next the mode of operation will be described. Upon depression of the shutter release button 1 against the coiled spring 4, the upper end of the slot 1c forces the one end 6a of the detent lever 6 against the click-motion spring 7 so that the lever 6 is rotated in the counterclockwise direction. As a result, the horizontal projection 6d at the other end 6b of the lever is moved upward to close the switch 9 so that the motor 11 starts to rotate to drive the shutter blade 14. When the click-motion spring 7 is compressed beyond its "dead point" by the one end 6a of the lever 6, the direction of the spring force of the click-motion spring 7 is suddenly reversed. That is, the click-motion spring 7 now acts to rotate the detent lever 6 in the counterclockwise direction. Therefore, the downwardly extending projection 6c is disengaged from the stopper 16 so that the shutter blade 14 may start to rotate for exposure.

To stop the exposure, the shutter release button 1 is released. That is, the shutter release button 1 is returned to its initial position under the force of the coiled spring 4, and when the point or the upper end of the adjusting screw 2 engages with the one end 6a of the lever 6, the detent lever 6 is caused to rotate in the clockwise direction against the click-motion spring 7. When the click-motion spring 7 is un-compressed beyond its "dead point," the direction of the spring force of the click-motion spring 7 is again suddenly reversed. That is, the click-motion spring 7 now helps the detent lever 6 rotate in the clockwise direction. As a consequence the downwardly extending projection 6c at the other end of the lever 6 engages again with the stopper 16 so that the rotation of the shutter blade 14 is locked. Simultaneously, the switch 9 is opened as the projection 8 moves downwardly so that the motor 11 is stopped.

The slit defined between the upper end of the slot 1c and the upper end of the adjusting screw 2 serves to absorb or compensate the difference between the speed of vertical movement of the shutter release button which is manually depressed and released, and the rotational speed of the detent lever which is rotated under the force of the click-motion spring. When the length of this slit is increased, the detent lever 6 is not actuated to stop the shutter blade even when the shutter release button is partially released. It is preferable that the position of the support 3b which supports one end of the click-motion spring may be adjustable so that the detent lever 6 may be actuated under the optimum conditions.

What is claimed is:

1. A shutter release device for use in a cine camera having a rotatable shutter blade including a stop element comprising a motor for rotating said shutter blade;

switch means actuable to energize and deenergize said motor;

a shutter release button means mounted for longitudinal actuation, said button means having a head portion located at one end thereof for manual operation and further having an elongated body portion;

a slot formed in the end of said body portion remote from said head portion, said slot extending from said body portion end to terminate at an inner end located partway along said body portion, and a closure element provided to close the open end of said slot;

a shutter lever pivotally mounted within the camera and having one end extending through said slot, said lever formed of a size such that a predetermined amount of free movement is provided longitudinally within said slot without contacting the ends of said slot;

an omega-shaped spring having one spring end fixed to the camera and the other spring end connected to said shutter lever one end;

said shutter lever having its other end formed with bifurcated projections, one projection adapted to contact said stop element to prevent shutter rotation, and the other projection adopted to actuate said switch means;

said button means movable from an initial at-rest position to an actuating position wherein said slot inner end contacts and rotates said shutter lever one end in one direction, said omega-shaped spring accelerating the rotation after a predetermined amount of rotative movement, and said projections disengaging from said stop element and energizing said motor, respectively; and said button means movable to return from said actuating position to said initial position wherein said slot closing element contacts and rotates said shutter lever one end in the opposite direction, said omega-shaped spring accelerating said rotation in the opposite direction after a predetermined amount of rotative movement, and said projections thereby engaging said stop element and denergizing said motor, respectively.

2. A shutter release device according to claim 1 in which said closure element comprises a screw threadedly received in said slot and adjustable therein to determine the length of said slot.

3. A shutter release device according to claim 1 in which a coil spring is mounted around said body portion adjacent said head portion to bias said button means to its initial position.

* * * * *